US012117608B2

(12) United States Patent
Carminati et al.

(10) Patent No.: US 12,117,608 B2
(45) Date of Patent: Oct. 15, 2024

(54) MEMS MICROMIRROR DEVICE ENVELOPED IN A PACKAGE HAVING A TRANSPARENT SURFACE AND HAVING A TILTABLE PLATFORM

(71) Applicant: STMicroelectronics S.r.l., Agrate Brianza (IT)

(72) Inventors: Roberto Carminati, Piancogno (IT); Nicolo' Boni, BG (IT); Massimiliano Merli, Pavia (IT); Enri Duqi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 667 days.

(21) Appl. No.: 17/369,145

(22) Filed: Jul. 7, 2021

(65) Prior Publication Data
US 2022/0011567 A1   Jan. 13, 2022

(30) Foreign Application Priority Data
Jul. 10, 2020   (IT) .................. 102020000016855

(51) Int. Cl.
G02B 26/08   (2006.01)
G02B 1/00   (2006.01)
G02B 26/10   (2006.01)
G02B 27/42   (2006.01)

(52) U.S. Cl.
CPC .......... *G02B 26/101* (2013.01); *G02B 1/002* (2013.01); *G02B 26/0833* (2013.01); *G02B 27/4233* (2013.01)

(58) Field of Classification Search
CPC .. G02B 26/101; G02B 1/002; G02B 26/0833; G02B 27/4233; G02B 5/1809; B81B 7/02; B81B 7/0032; B81B 7/0067; B81B 2201/042
See application file for complete search history.

(56) References Cited

U.S. PATENT DOCUMENTS

| 2002/0018276 | A1 | 2/2002 | Suga |
| 2010/0330332 | A1 | 12/2010 | Quenzer et al. |
| 2015/0055204 | A1* | 2/2015 | Ichii ............ G02B 26/101 359/214.1 |
| 2017/0182597 | A1* | 6/2017 | Abdou-Ahmed .... G02B 5/1861 |
| 2017/0184707 | A1 | 6/2017 | Sugiura et al. |

(Continued)

FOREIGN PATENT DOCUMENTS

| EP | 1748029 A2 | 1/2007 |
| EP | 3232247 A1 | 10/2017 |

(Continued)

OTHER PUBLICATIONS

IT Search Report and Written Opinion for IT Appl. No. 102020000016855 dated Feb. 18, 2021 (8 pages).

(Continued)

*Primary Examiner* — Euncha P Cherry
(74) *Attorney, Agent, or Firm* — Crowe & Dunlevy LLC

(57) ABSTRACT

A MEMS micromirror device is formed in a package including a containment body and a lid transparent to a light radiation. The package forms a cavity housing a tiltable platform having a reflecting surface. A metastructure is formed on the lid and/or on the reflecting surface and includes a plurality of diffractive optical elements.

5 Claims, 11 Drawing Sheets

(56) References Cited

U.S. PATENT DOCUMENTS

| | | | |
|---|---|---|---|
| 2017/0269354 A1* | 9/2017 | Suzuki | G02B 26/10 |
| 2018/0364487 A1* | 12/2018 | Yeoh | G02B 26/004 |
| 2019/0097722 A1* | 3/2019 | McLaurin | G02B 27/0916 |

FOREIGN PATENT DOCUMENTS

| | | | |
|---|---|---|---|
| EP | 2262720 B1 | 4/2019 |
| JP | 2011118179 A | 6/2011 |
| WO | 0138240 A1 | 5/2001 |

OTHER PUBLICATIONS

Li, Nanxi, et al: "Large-area Pixelated Metasurface Beam Deflector on a 12-inch Glass Wafer for Random Point Generation," Nanophotonics 2019; 1855-1861.
Yu, Nanfang, et al: "Flat Optics With Designer Metasurfaces," Nature Materials, Jan. 23, 2014, 139-150.
European Search Report for co-pending EP Appl. No 21184894.0 dated Aug. 27, 2021 (8 pages).

* cited by examiner

MEMS MICROMIRROR DEVICE ENVELOPED IN A PACKAGE HAVING A TRANSPARENT SURFACE AND HAVING A TILTABLE PLATFORM

PRIORITY CLAIM

This application claims the priority benefit of Italian Application for Patent Number 102020000016855, filed Jul. 10, 2020, the contents of which are incorporated by reference in their entirety.

TECHNICAL FIELD

This disclosure relates to a MEMS micromirror device enveloped in a package having a transparent surface and having a tiltable platform.

BACKGROUND

Certain known MEMS devices have a mirror structure obtained using semiconductor technology.

Such MEMS micromirror devices find wide application since they enable stringent requisites to be met concerning bulk, both with regard to area and thickness.

The above devices are therefore widely used in portable apparatuses, such as portable computers, laptops, notebooks (including ultra-thin notebooks), PDAs, tablets, smartphones, apparatuses for optical applications, in particular for directing, according to desired modalities, light radiation beams generated by a light source, etc.

For instance, micro-electro-mechanical-systems (MEMS) mirror devices are used in miniaturized projector modules (e.g., picoprojectors), which are able to project images at a distance or generate desired patterns of light. Moreover, they are useful in applications for augmented-reality glasses and visors, as well as in LIDAR (Light Detection and Ranging) scanning devices.

LIDAR technology enables measurement of the distance from a target within a field of vision by illuminating the target with a laser beam, detecting the laser beam reflected by the target as a return beam with a sensor, and determining the time elapsed ("return time") between transmission of the laser beam toward the target and reception of the return beam. By illuminating, with the laser beam, different targets within the field of vision, from the difference between the return times it is possible to construct a set of points forming a three-dimensional digital representation of the field of vision.

For this reason, the LIDAR technique is useful for creating high-resolution maps, with applications in geodesy, geomatics, archaeology, geography, geology, geomorphology, seismology, silviculture, atmospheric physics, laser driving, ALSM (Airborne Laser Swath Mapping), and laser altimetry. LIDAR technology is also used in control and navigation of autonomous vehicles or in advanced systems for driver assistance in certain vehicles.

Micro-electro-mechanical mirror devices generally include a mirror element suspended over/in a cavity and obtained from a semiconductor material body so as to be mobile, typically with an inclination movement or rotation movement, for directing the incident light beam in a desired way.

For instance, FIG. 1 schematically shows a picoprojector 1 comprising a light source 2, typically a laser source, generating a combined light beam 3 made up of three monochromatic beams, one for each base color, which, through optics 4 shown schematically, is deflected by a mirror element 5 toward a screen 6 where a scan 7 is produced. In the shown example, the mirror element 5 comprises two micromirrors 8, 9 arranged in sequence along the path of the light beam 3 and each rotatable about one of its axes; in particular, a first micromirror 8 is rotatable about a vertical axis A and a second micromirror is rotatable about a horizontal axis B, perpendicular to the vertical axis A. Rotation of the first micromirror 8 about the vertical axis A generates a fast horizontal scan, as shown in FIG. 1. Rotation of the second micromirror 9 about the horizontal axis B generates a slow vertical scan.

In certain applications, such as in augmented-reality systems and in LIDAR devices referred to above, the mirror element or each micromirror 8, 9 is kept in an environment at low pressure via a hermetic package having at least one transparent side. In this way, it is possible to obtain excellent performance thanks to the increase in the Q factor due to the low pressure existing therein.

For instance, FIG. 2 shows a generic micromirror 10, which implements the micromirror 8 or 9 of FIG. 1.

The micromirror 10 comprises a tiltable platform 11 having a reflecting surface 11A and carried by a body 12 through a supporting and actuation structure not shown, enabling rotation of the tiltable platform 11 at least about an axis 15. Here, the body 12 is cup-shaped and is closed on top by a lid 16 having an outer surface 16A and a rear surface 16B.

The lid 16 is formed or comprises a transparent wall, for example, of glass (in particular, silicon oxide), which enables an external incident ray Li to reach the tiltable platform 11 and to be reflected outward, as reflected ray Lr, with an orientation linked to the momentary angular position of the tiltable platform 11.

In use, however, the lid 16 may give rise to artifact images due to spurious reflections caused by the lid 16. For instance, the external incident ray Li, input to the micromirror 10, is in part transmitted by the lid 16 towards the tiltable platform 11 and in part reflected directly by the outer surface 16A as spurious ray Ls. Similar spurious rays (not shown) may be generated from the external ray Li incident on the rear surface 16B of the lid 16 and also (following upon multiple reflections) from the reflected ray Lr. These spurious reflections, due to the different optical paths, may give rise to patches and noise on a target, screen, or user toward which the reflected ray Lr is directed and/or on a unit for detecting and evaluating the elapsed time or of some other parameter of the reflected light radiation.

To overcome this, various approaches have been studied, such as arrangement of an ARC (Anti-Reflective Coating) layer on the lid 16 in order to eliminate any spurious reflection; treatment of the surfaces 16A, 16B to reduce the refractive index thereof; and arrangement of the lid 16 (or at least of a part thereof) in an inclined position with respect to the reflecting surface 11A of the tiltable platform. For instance, the latter approach is shown in European Patent Number 1,748,029 (incorporated by reference) and allows the spurious ray Ls (as well as the one generated on the rear surface 16B of the lid 16) to be oriented in considerably different directions from the reflected ray Lr, so that they do not strike the target or are not detected thereby.

The above approaches do not, however, fully address the issues in a satisfactory way. In fact, the anti-reflective layers or the surface treatment are not sufficiently effective in eliminating spurious reflection, in particular with visible light, where the reflected patch is of large dimensions. On the other hand, the inclined arrangement of the lid or the inclined shape of a part of the lid entails major manufacturing difficulties, and the glass wafer bonded to the wafer that forms the body 12 is brittle and difficult to handle by current production apparatuses, involving high manufacturing costs, low throughput, and a large number of production rejects.

There is a need in the art to provide a micromirror that overcomes the drawbacks of the prior art.

SUMMARY

According to this disclosure, a MEMS micromirror device comprises a package including a containment body and a lid transparent to light radiation, the package forming a cavity, with a tiltable platform housed in the cavity and having a reflecting surface, and with a metastructure formed on the package and/or on the reflecting surface, the metastructure including a plurality of diffractive optical elements.

A first diffractive elementary cell may be formed by first diffractive optical elements of the plurality of diffractive optical elements, the first diffractive elementary cell having an area extending in a plane and the first diffractive optical elements of the first diffractive elementary cell being arranged with a first variable density linearly variable in a variability direction belonging to the plane.

The tiltable platform may be configured to be rotatable about a rotation axis and the variability direction may be perpendicular to the rotation axis.

The first diffractive optical elements of the first diffractive elementary cell may have dimensions in the variability direction that are linearly variable and/or are arranged in the variability direction at an inter-element distance that is linearly variable.

The dimensions in the variability direction and the inter-element distance may be smaller than a wavelength of the light radiation in an application field of the MEMS micromirror device.

At least one second diffractive elementary cell may be formed by second diffractive optical elements of the plurality of diffractive optical elements, the second diffractive optical elements being arranged with the first density linearly variable in the variability direction, the first diffractive elementary cell and the second diffractive elementary cell being arranged alongside each other in the variability direction at an inter-cell distance equal to a multiple of $2\pi\lambda$, where $\lambda$ is a wavelength of the light radiation in an application field of the MEMS micromirror device.

The diffractive optical elements of the plurality of diffractive optical elements may be formed by columns.

The diffractive optical elements of the plurality of diffractive optical elements may be of a material having a first refractive index and are immersed in a medium having a second refractive index, wherein the first refractive index is greater than the second refractive index.

The diffractive optical elements of the plurality of diffractive optical elements may project from a bearing surface.

The diffractive optical elements of the plurality of diffractive optical elements may extend through a dielectric layer.

The dielectric layer may be silicon dioxide.

The diffractive optical elements of the plurality of diffractive optical elements may be formed by openings made in a dielectric layer.

The dielectric layer may be a silicon-oxide layer.

The lid may be made of an optically transparent material and has an inner surface facing the tiltable platform and an outer surface opposite to the inner surface, wherein the metastructure is formed on the outer surface of the lid.

There may be third diffractive optical elements of the plurality of diffractive optical elements, wherein the third diffractive optical elements are formed on the inner surface of the lid, forming at least one third diffractive elementary cell, and which are arranged with a third density linearly variable in a direction parallel to the variability direction, the third linearly variable density being equal to the first linearly variable density.

The tiltable platform may have a reflecting surface facing the lid, and the plurality of diffractive optical elements is formed on the reflecting surface.

The reflecting surface may include a metallization layer and the metastructure is formed directly on the metallization layer.

The reflecting surface may include a metallization layer and a dielectric layer, and the metastructure may be formed on the dielectric layer.

Also disclosed herein is a MEMS micromirror device, including a package comprising a containment body and a transparent lid, the package shaped so as to define a cavity, and a tiltable platform disposed within in the cavity and having a reflecting surface, with a metastructure formed on the package and including a plurality of diffractive optical elements, wherein the plurality of diffractive optical elements are formed by columns having an area extending in a plane, the plurality of diffractive optical elements being arranged with a variable density linearly variable in a variability direction belonging to the plane.

The columns may be polyhedral in shape.

The polyhedral shaped columns may have a diameter increasing along the variability direction and may be arranged at constant pitches.

The columns may be parallelepipedal in shape, having a long side parallel to a direction perpendicular to the variability direction and a diameter increasing along the variability dimension.

BRIEF DESCRIPTION OF THE DRAWINGS

For a better understanding, some embodiments thereof are now described, purely by way of non-limiting example, with reference to the attached drawings, wherein.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
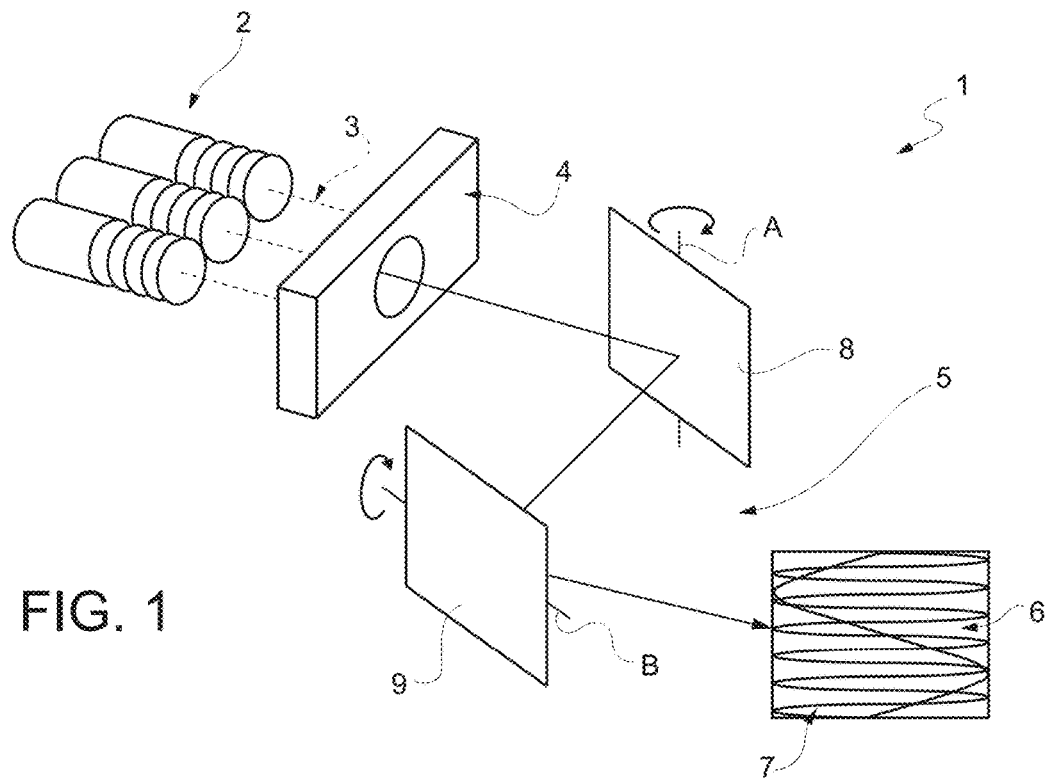
FIG. 1 is a schematic representation of a picoprojector using one-dimensional MEMS mirror elements.
Figure 2:
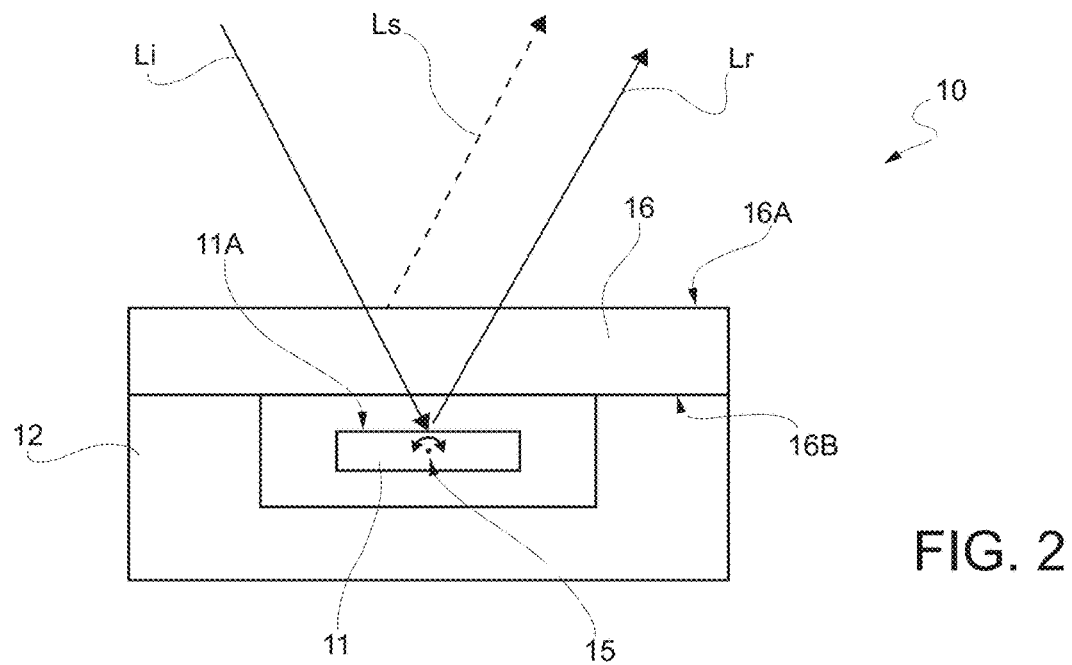
FIG. 2 is a cross-section of a known MEMS mirror element.
Figure 3:
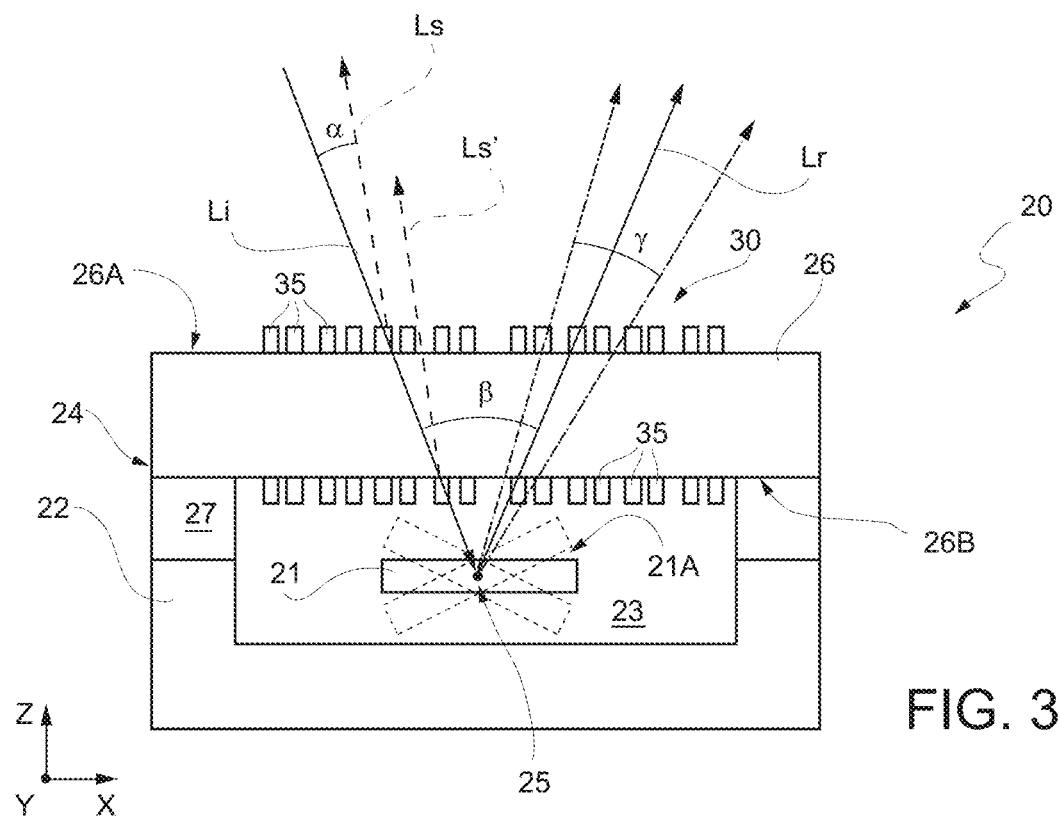
FIG. 3 is a cross-section of an embodiment of the MEMS micromirror device disclosed herein.

FIG. 3 is a schematic representation of a MEMS micromirror device 20.

The MEMS micromirror device 20 is of a uniaxial type and comprises a tiltable platform 21. The tiltable platform 21 has a reflecting surface 21A and is carried by a body 22 through a supporting and actuation structure (not shown), enabling rotation of the tiltable platform 21 about an oscillation axis 25.

Here, the body 22 is cup-shaped, defines a cavity 23 housing the tiltable platform 21, and is closed on top by a lid 26, fixed to the body 22 through an adhesive layer 27. Alternatively, the body 22 may have a bottom and a side wall bonded together so as to define the cavity 23. The body 22 may be of semiconductor material, such as silicon, and the tiltable platform 21 may be obtained in a monolithic way with the body 22.

The body 22 and the lid 26 form a package 24. In the embodiment shown, the package 24 is hermetically closed by the adhesive layer 27, and a depression may be present therein to obtain a high-quality factor.

The lid 26 is here formed by a transparent planar wall, for example, of glass, having a first surface 26A facing the outside of the MEMS micromirror device 20 and a second surface 26B facing the inside of the MEMS micromirror device 20, toward the reflecting surface 21A of the tiltable platform 21. The first and second surfaces 26A, 26B of the lid are planar and lie in planes parallel to each other and parallel to a horizontal plane XY of a Cartesian reference system XYZ.

In the embodiment shown, the oscillation axis 25 of the tiltable platform 21 is parallel to the first plane and to a first axis Y of the Cartesian reference system XYZ. In addition, in rest condition, the reflecting surface 21A of the tiltable platform 21 is parallel to the surfaces 26A and 26B of the lid 26. Consequently, the MEMS micromirror device 20 is configured to receive an incident light radiation Li and generate a reflected light radiation Lr, where the incident light radiation Li and the reflected light radiation Lr form between them an angle depending upon the instantaneous angular position of the tiltable platform 21 and lying in a vertical plane XZ of the Cartesian reference system XYZ.

In FIG. 3, the scanning angle that may be obtained as a result of rotation of the tiltable platform 21 is designated by y.

According to an embodiment of the present invention shown in FIG. 3, the lid 26 carries, on the first surface 26A, a first metastructure 30 and, on the second surface 26B, a second metastructure 31 configured to form respective metasurfaces.

The metasurfaces (such as the ones formed by the metastructures 30, 31) are formed by diffractive optical elements of smaller or comparable dimensions to the light wavelength and are arranged in a regular way so as to modify the wavefronts in a desired manner regarding phase, amplitude, and polarization (see, for example, Yu, et al., "Flat optics with designer metasurfaces", Nature Materials, Vol. 13, 23 Feb. 2014, DOI 10.1038NMT3839, Macmillan Publishers, incorporated by reference).

In FIG. 3, the metastructures 30, 31 are formed by diffractive optical elements 35 configured and/or arranged to have linearly variable densities in order to be equivalent to inclined surfaces regarding light radiation reflected by the lid 26, as discussed hereinafter.

In particular, here the diffractive optical elements 35 have a density variable in a first extension direction given by the intersection of the horizontal plane XY and the vertical plane XZ. The first extension direction is here perpendicular to the first axis Y and parallel to a second axis X of the Cartesian reference system XYZ and therefore referred to hereinafter also as first extension direction X.

The diffractive optical elements 35 are obtained in optically thin layers (having a thickness smaller than the light wavelength in the considered frequency range) and, in the first extension direction X, have smaller dimensions and/or pitch than the wavelength of the incident light radiation Li; in particular, in the first extension direction X, they may have dimensions (width) or distancing equal at the most to $\lambda/5$, where $\lambda$ is the wavelength of the incident light radiation, and a maximum height equal to $\lambda/2$.

The first metastructure 30 causes a spurious reflected radiation Ls on the first surface 26A of the lid 26 to be deflected, with respect to the incident light radiation Li, by an angle $\alpha$, lying in the second plane XZ, different from the angle obtainable in the absence of the metastructure 30. In practice, the angle $\alpha$ of the spurious reflected radiation Ls corresponds to the reflection that there would be if the first surface 26A were inclined with respect to the laying plane XY. An analogous deflection is caused by the second metastructure 31 on the second surface 26B of the lid 26, as indicated in FIG. 3 by the spurious reflected radiation Ls'.

In this way, by appropriately sizing the density variation provided by the metastructures 30, 31, as described in detail hereinafter with reference to FIGS. 5-18, the spurious reflected radiation Ls may be oriented in a direction such as not to interfere with a target along the path of propagation of the reflected light radiation Lr.

In fact, as discussed in the Yu, et al. article "Flat optics with designer metasurfaces" cited above, the metastructures 30 and 31 cause a phase delay of the spurious reflected radiation Ls with respect to incident light radiation Li.

Figure 4:
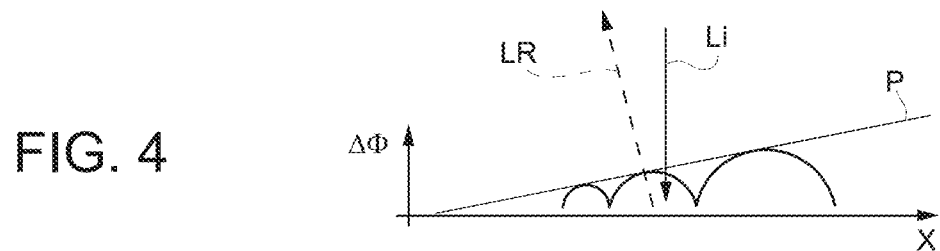
FIG. 4 shows the effect of a structure having a metasurface with a progressive profile on a reflected wavefront of an incident light beam.

In this regard, see also FIG. 4, which illustrates the effect of a linear plot of the phase delay $\Delta\phi$, having a phase-delay profile P along the second axis X, in accordance with Huygens' principle. As may be noted, a linear phase delay causes tilting of the reflected light radiation LR with respect to the incident light radiation Li perpendicular to the second axis X.

In fact, the phase delay $\Delta\phi^{\Delta\varnothing}$ caused by the passage of a light radiation having wavelength λ in a material with a refractive index n in a path along the second axis X is:

$$\Delta\phi = \frac{2\pi n}{\lambda} x$$

Figure 5:
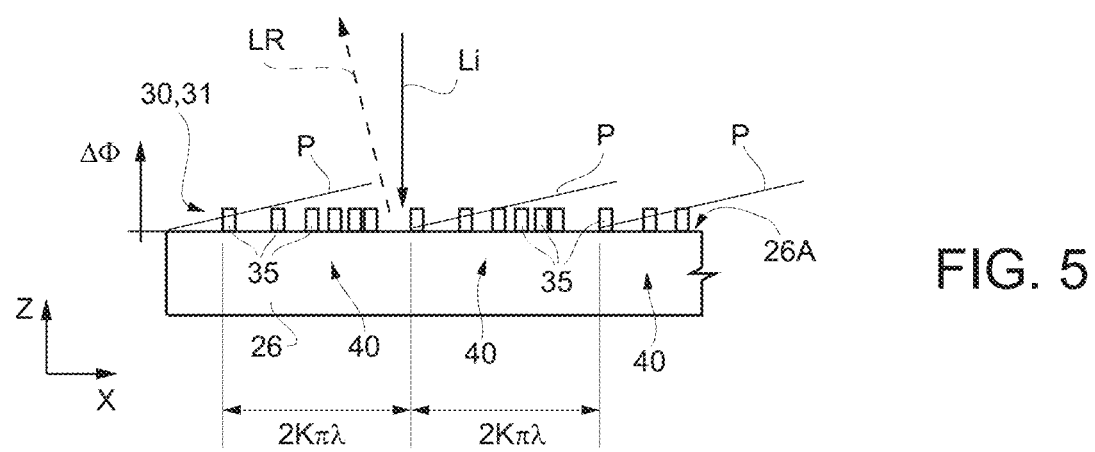
FIG. 5 shows an enlarged view of the micromirror device of FIG. 3, according to one embodiment.

As mentioned, in the MEMS mirror device 20, the linear profile of the phase delay P is obtained through the linearly variable density arrangement of the diffractive optical elements 35 of the metastructures 30, 31. With reference to FIG. 5, in general, the metastructures 30, 31 may comprise a plurality of elementary cells 40, each formed by diffractive optical elements 35 arranged with linearly variable density, so that the respective phase-delay profiles P are arranged to form a sawtooth pattern. In an embodiment, an elementary cell 40 comprises at least four diffractive optical elements 35.

Moreover, in FIG. 5, the elementary cells 40 are arranged at a distance equal to a multiple of 2πλ, so that the interference of the spurious light radiation Ls is always of a constructive type.

Consequently, as a result of the configuration of the metastructures 30, 31, the lid 26 originates an inclined reflected light radiation LR.

The configuration with linearly variable density of the metastructures 30, 31 may be obtained as described hereinafter.

Figure 6:
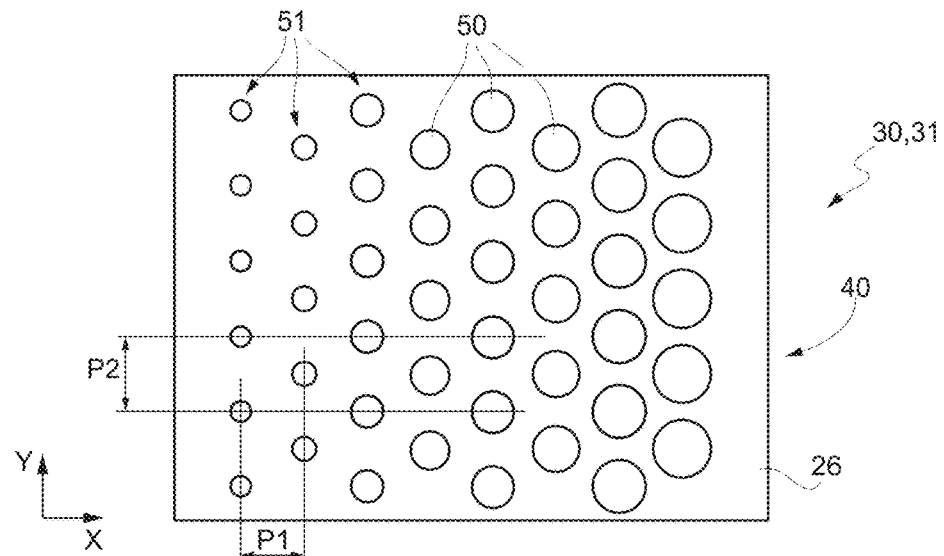
FIGS. 6 and 7 are a top view and a lateral view, respectively, of a possible configuration of a metasurface of the present micromirror device.
Figure 7:
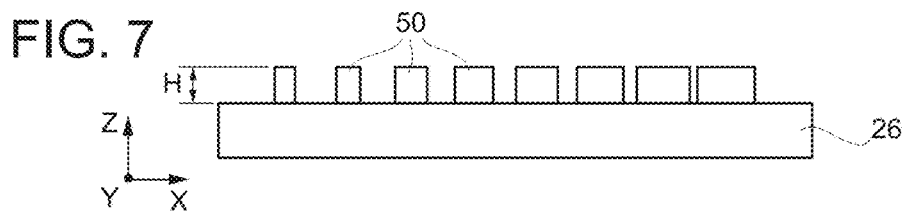

FIGS. 6 and 7 show a metastructure 30, 31, which may be used for the MEMS micromirror device 20 of FIG. 3 and is formed by a single elementary cell 40. Here, the diffractive optical elements 35 are formed by columns 50 having a cylindrical shape with a diameter increasing in the first extension direction X.

The columns 50 are made of a material having a refractive index with high contrast with respect to the medium they are immersed in, here air. For instance, the difference between the refractive index of the material of the columns 50 and the refractive index of the medium where they are located (at the frequencies of the used light) may be at least +0.5, such as +1. According to one embodiment, the columns 50 are of dielectric material, such as amorphous silicon, silicon nitride, or titanium dioxide, and are formed directly on the lid 26, projecting therefrom, without any material arranged in between.

In the embodiment of FIGS. 6 and 7, the columns 50 are aligned in rows 51 along the first axis Y, perpendicular to the first extension direction X and forming a second extension direction; the rows 51 are arranged at a fixed distance along the first extension direction X (with a first pitch P1); the columns 50 of each row 51 are arranged at a fixed distance along the second extension direction Y (with a second pitch P2); the columns 50 of each row 51 are moreover staggered with respect to the columns 50 of the adjacent rows 51 by a distance equal to one half of the second pitch P2, so as to exploit the area of the elementary cell 40 in an optimal way.

The columns 50 typically have a height H (FIG. 7) comprised between 100 and 200 nm and a base diameter comprised between 10 and 200 nm when the MEMS micromirror device 20 is designed to work in the visible and between 50 and 500 nm if it operates in the infrared. In addition, the first pitch P1 may be comprised between 50 and 200 nm, and the second pitch P2 may be comprised between 50 and 200 nm.

In FIGS. 6 and 7, the variation of dimension of the columns 50 in the first extension direction X makes it possible to obtain a density of diffractive material increasing from left to right; consequently, the reflected light radiation LR has a phase delay increasing towards the right and the reflected light radiation Lr is inclined with respect to the incident light radiation Li, as discussed previously with reference to FIGS. 4-5.

Figure 8:
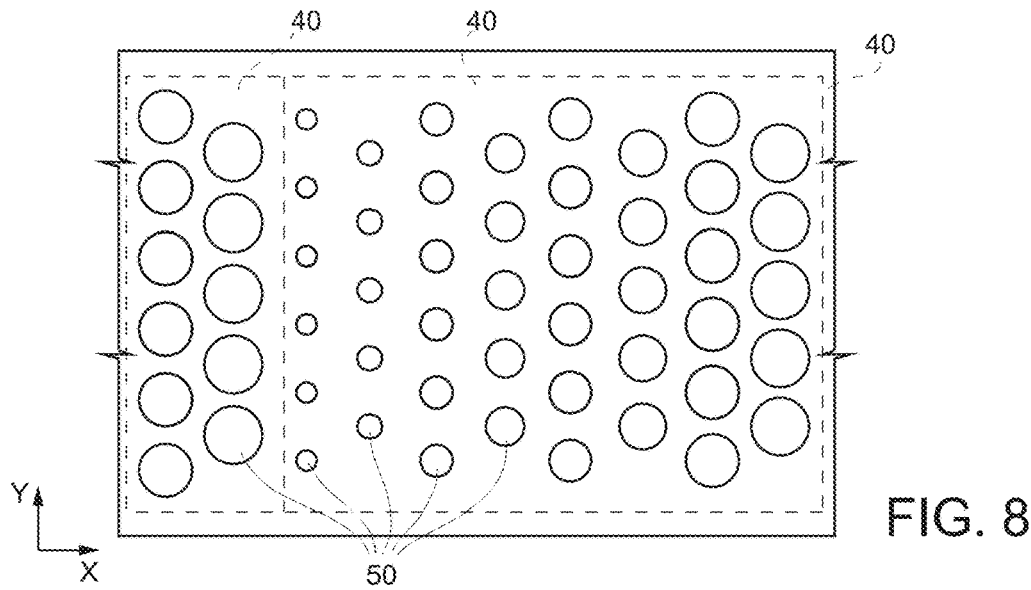
FIGS. 8 and 9 are, respectively, a top view and a lateral view of a possible implementation based upon the repetition of the configuration of FIGS. 6 and 7.
Figure 9:
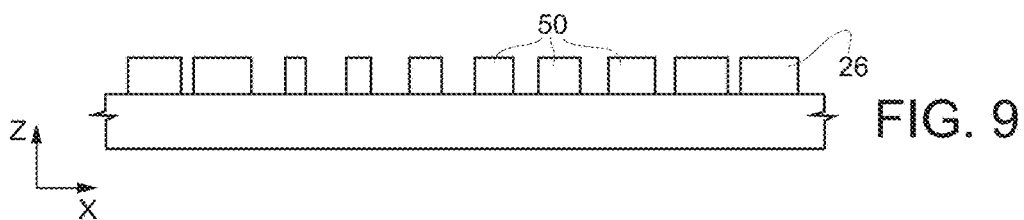

FIGS. 8 and 9 show a metastructure 30, 31 comprising a plurality of elementary cells 40, arranged alongside each other in the first extension direction X.

The columns 50 may have dimensions and first and second pitches P1, P2 and may be obtained as described in detail with reference to FIGS. 6 and 7.

Figure 10:
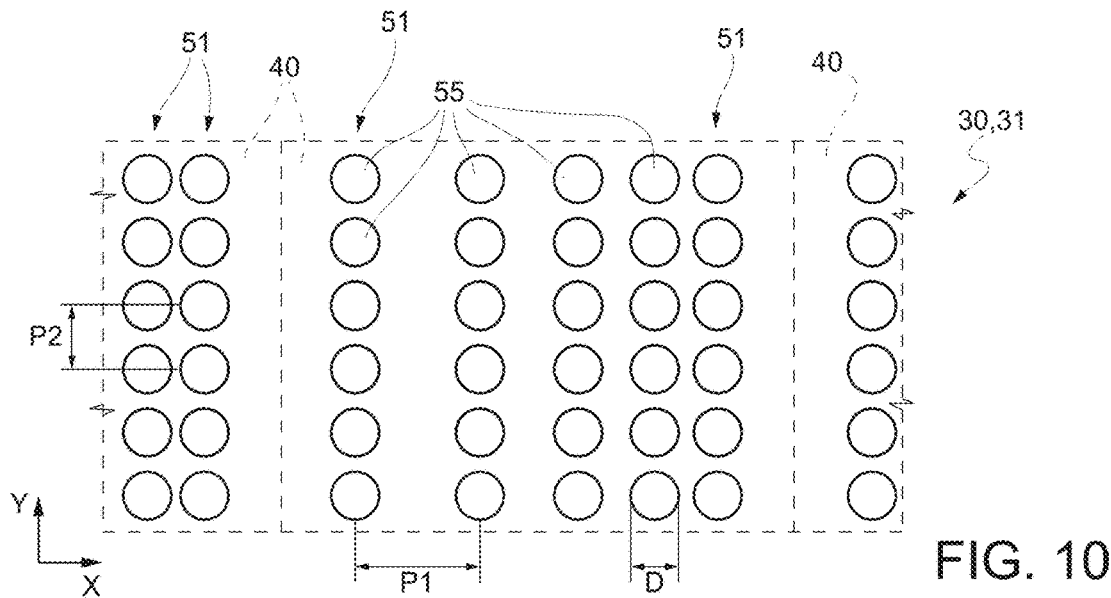
FIGS. 10 and 11 are, respectively, a top view and a lateral view of a different configuration of a metasurface of the present micromirror device.
Figure 11:
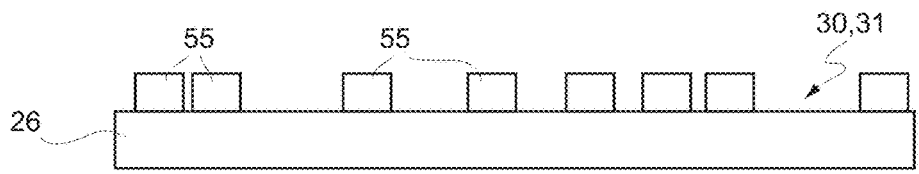

FIGS. 10 and 11 show a metastructure 30, 31 comprising a plurality of elementary cells 40 wherein the diffractive optical elements 35 are formed by columns 55 having a cylindrical shape and constant diameter, arranged at a decreasing distance from each other in the first extension direction X. The columns 55 are arranged also here at a constant distance from each other along the axis Y and form, in practice, rows (designated again by 51) arranged at a variable and linearly decreasing pitch P1 with respect to each other. Also in this case, the second pitch P2 (distance between the columns 55 in the second extension direction Y) is constant; moreover, here, the columns 55 of the various rows 51 are also aligned in the first extension direction X.

The first pitch P1 therefore varies between a maximum and a minimum values comprised between the values indicated above for the columns 55. Likewise, the second pitch P2 and the diameter D of the columns 55 may vary between the values indicated above for the embodiment of FIGS. 6 and 7.

Consequently, also in this case, a diffractive material density increasing from left to right is obtained so as to cause tilting of the reflected light radiation Lr with respect to the incident light radiation Li (FIG. 5).

Figure 12:
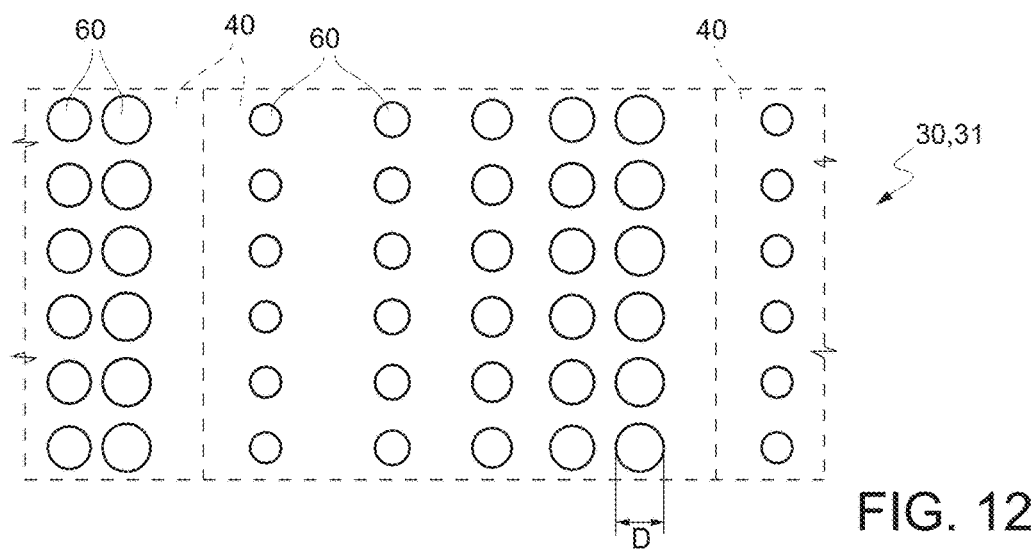
FIGS. 12 and 13 are, respectively, a top view and a lateral view of another configuration of a metasurface of the present micromirror device.
Figure 13:
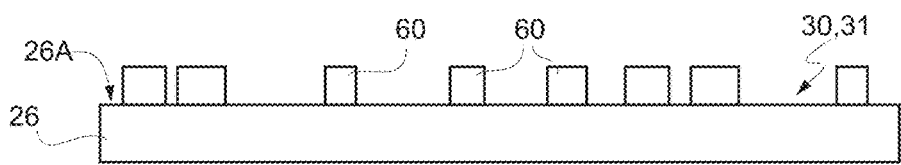

In the metastructure 30, 31 of FIGS. 12 and 13 the elementary cells 40 comprise diffractive optical elements 35 formed by columns 60 of variable dimensions and arranged at variable distances.

In practice, in this embodiment, in the first extension direction X, both the first pitch P1 and the diameter D vary. Also in this case, a diffractive material density increasing from left to right is therefore obtained.

Figure 14:
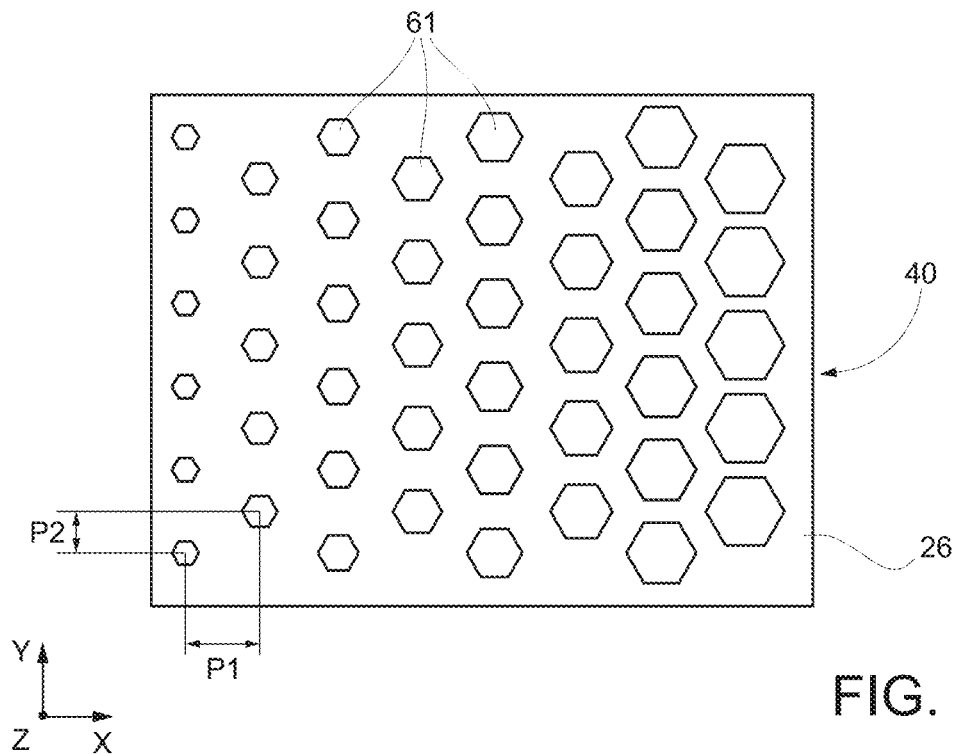
FIGS. 14 and 15 are top views of variants of the configuration shown in FIGS. 6 and 7.

FIG. 14 shows a variant of the configuration of FIG. 6. Here, the diffractive optical elements 35 are formed by columns 61 having a polyhedral shape (in the drawing hexagonal) of a diameter increasing in the first extension direction X and arranged at constant pitches P1 and P2. In this embodiment, the lateral view is the same as FIG. 7.

Figure 15:
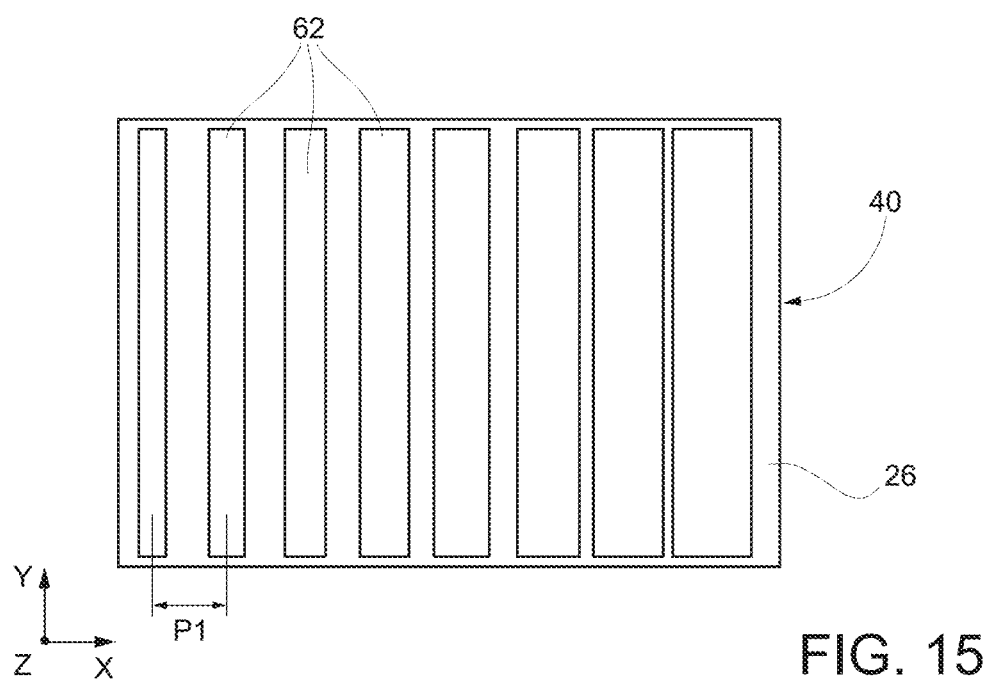

FIG. 15 shows another variant of the configuration of FIG. 6. Here, the diffractive optical elements 35 are formed by columns 62 having a parallelepipedal shape, with a long side parallel to the second extension direction Y and a short side increasing along the first extension direction X. Here, the first pitch P1 is constant, and the lateral view is the same as that of FIG. 7.

Figure 16:
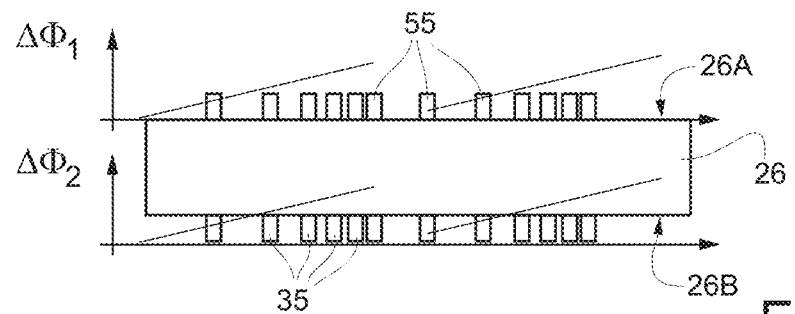
FIG. 16 shows an implementation of a part of the micromirror device of FIG. 3.

FIG. 16 shows the arrangement of the metastructures 30 and 31 on the two surfaces 26A, 26B of the lid 26. To obtain a same inclination effect of the reflected light radiation, the metastructures 30 and 31 have the same configuration, i.e., the same direction and variation degree of the diffractive material density. In this way, the metastructures 30 and 31 yield two equal phase-delay profiles P, and therefore $$\Delta\phi_2 = \Delta\phi_1$$

where $\Delta\phi_2$ is the phase delay on the second surface 26B and $\Delta\phi_1$ is the phase delay on the first surface 26A. In particular, the metastructures 30 and 31 are equal (i.e., they comprise only columns 50 or columns 55 or columns 60), even though it is not necessary for them to be vertically aligned to each other.

Figure 17:
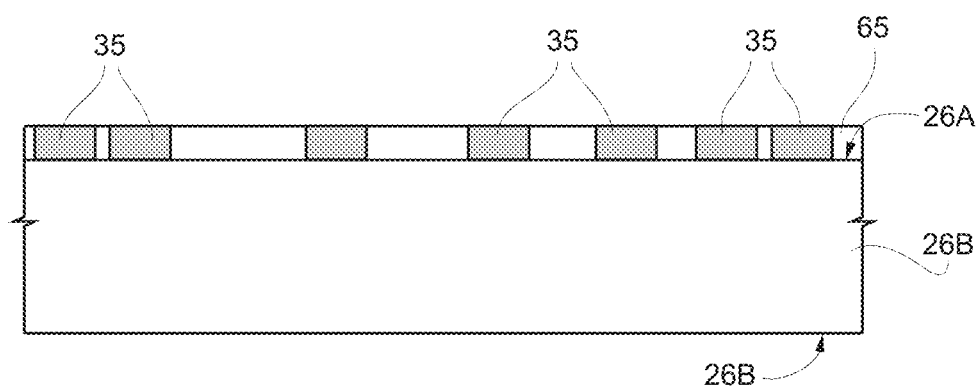
FIGS. 17 and 18 show two possible different embodiments of a part of the present micromirror device.

FIG. 17 shows an embodiment wherein the columns 50, 55 or 60 are embedded in a dielectric layer 65 of a material having lower refractive index than the columns 50, 55 or 60, such as silicon dioxide, extending over the first surface 26A of the lid 26 and/or the second surface 26B of the lid 26.

Figure 18:
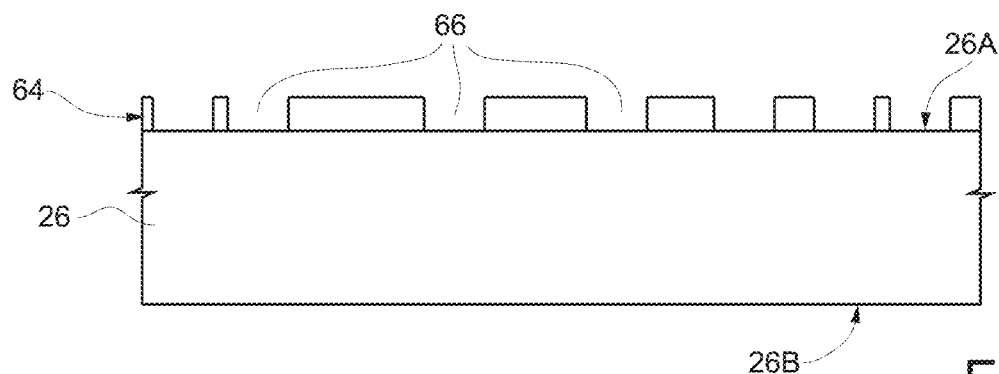

FIG. 18 shows a different embodiment, where the diffractive optical elements are formed by cavities or openings 66, in particular through openings, formed in a diffractive layer 67 extending over the first surface 26A and/or the second surface 26B of the lid 26 and having a refractive index such that the difference between the refractive index of the diffractive layer 67 and air (at the frequencies of the used light) is greater than or equal to 0.5. For instance, the diffractive layer 67 may be silicon oxide.

Figure 19:
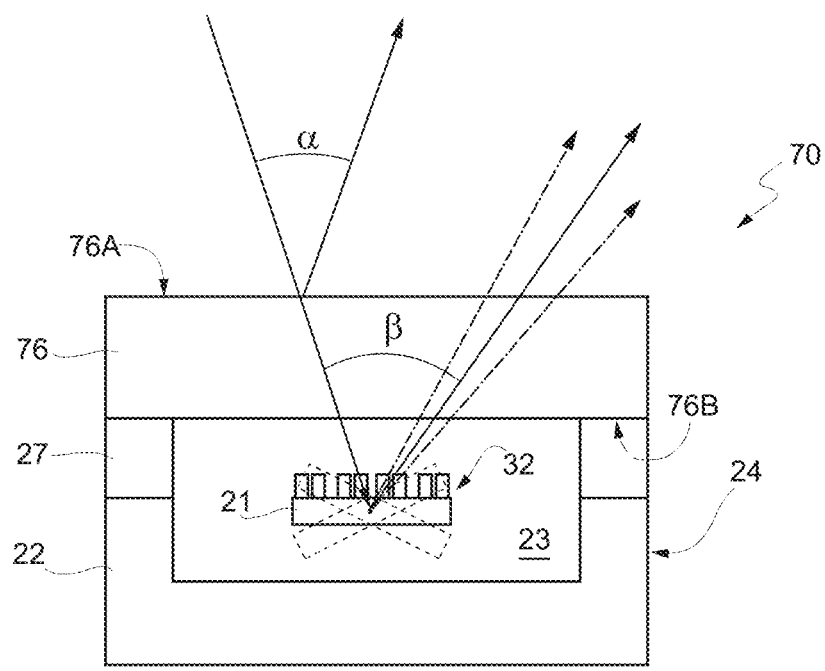
FIG. 19 shows a different embodiment of the present micromirror device.

FIG. 19 shows a different embodiment of a MEMS micromirror device 70.

The micromirror device 70 has a structure similar to the MEMS micromirror device 20 of FIG. 3; consequently, parts that are similar are designated by the same reference numbers and will not be described any further.

In the embodiment of FIG. 19, the lid, designated by 76, has a standard planar structure. An anti-reflective layer (not shown) may be provided on its first surface 26A or on both surfaces 76, 76B.

A third metastructure 32 is formed on the reflecting surface 21A of the tiltable platform 21.

Figure 20:
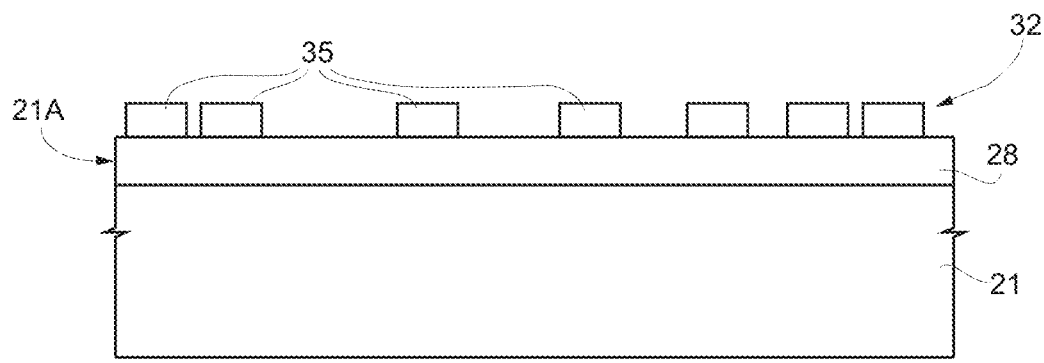
FIGS. 20 and 21 show two variants of a detail of the embodiment of FIG. 19.

For instance, as shown in FIG. 20, the tiltable platform 21 has a metallization layer 28, for example of gold or aluminum, which forms the reflecting surface 21A, and the third metastructure 32 is provided directly on the metallization layer 28.

Figure 21:
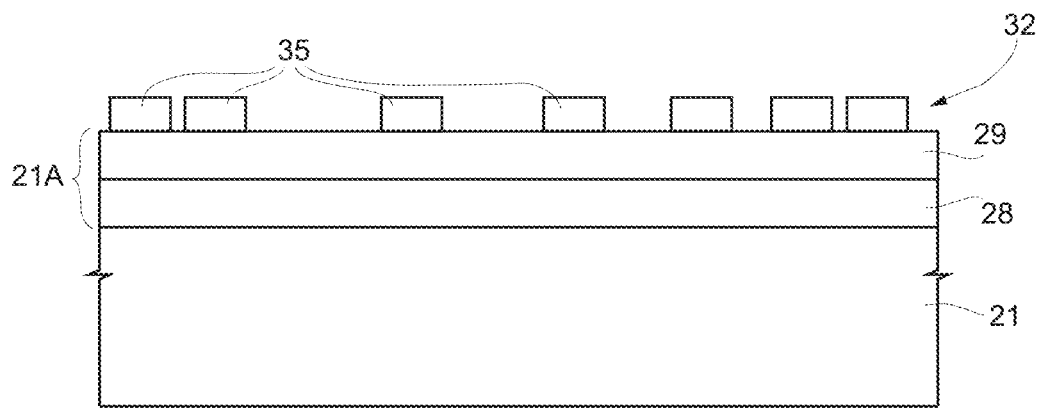

Alternatively, as shown in FIG. 21, the metallization layer 28 is covered by a dielectric layer 29, for example, of silicon oxide, and the third metastructure 32 is formed on the dielectric layer 29.

The third metastructure 32 may be configured in any way described above and shown in FIGS. 6-18 for the first and second metastructures 30, 31; it thus comprises a plurality of diffractive optical elements 35 (for example, the columns 50, 55, 60, 61 or 62, surrounded by air or by the dielectric layer 65, or the openings 66 of FIG. 16). Moreover, it may comprise a plurality of elementary cells 40.

The metastructures 30-32 may be manufactured using the photolithographic steps for processing micromechanical devices having parts smaller in dimension than the light wavelength (see, for example Nanxi Li et al., "Large area pixelated metasurface beam deflector on a 12-inch glass wafer for random point generation", Nanophotonics 2019; 8(10): pp. 1855-1861 (incorporated by reference). Alternatively, nano-imprinting lithography techniques may also be used.

In particular, the MEMS micromirror device 20, 70 may be processed at the wafer level. In this case, the body 22 and the tiltable platform 21 may be formed in a semiconductor material wafer for a plurality of devices; a glass wafer may be processed to form the metastructures 30-32 of the devices. Then the two wafers may be bonded and diced, to obtain a plurality of single MEMS micromirror devices 20 or 70.

Figure 22:
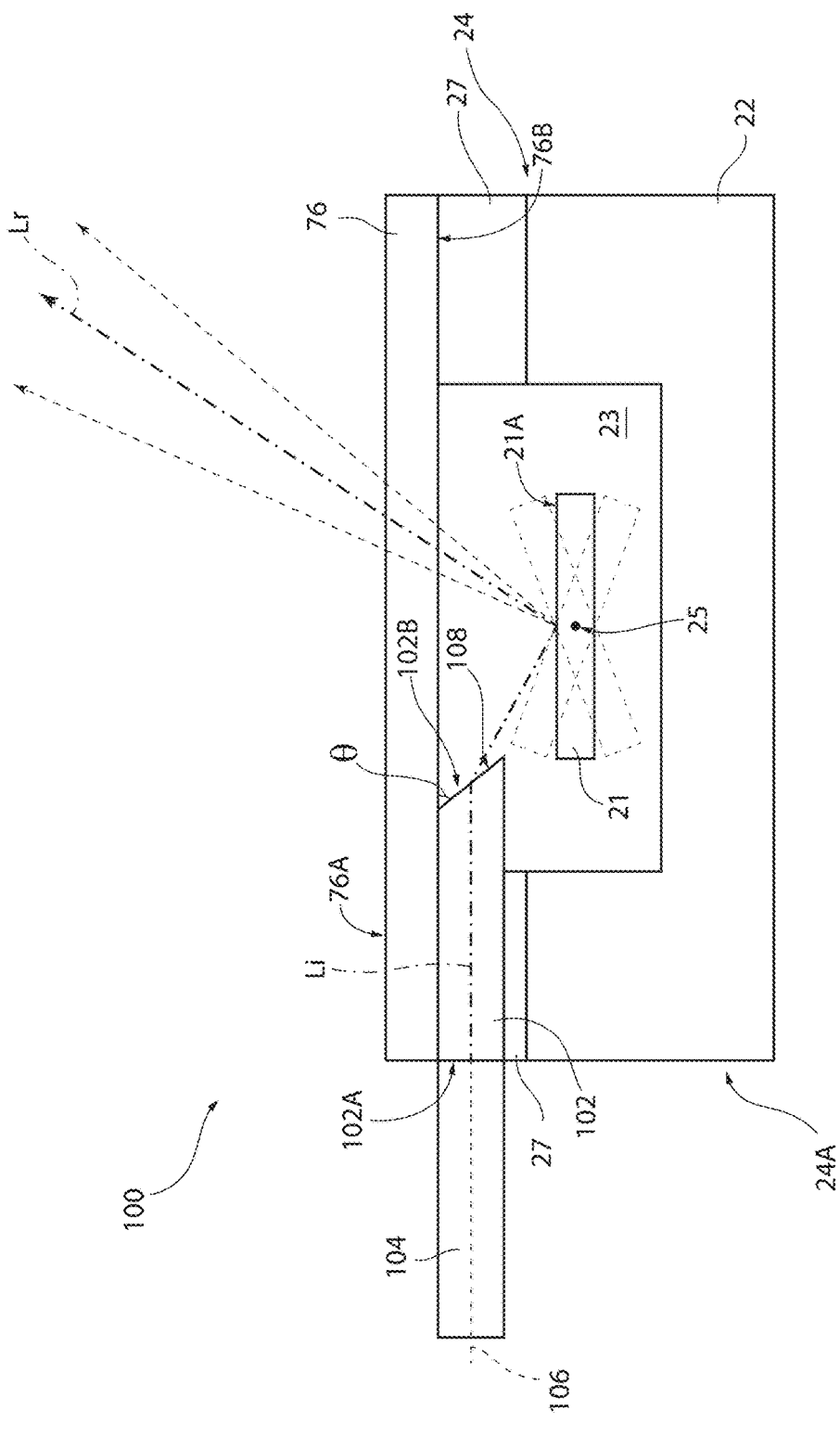
FIG. 22 shows a different embodiment of the present micromirror device.

FIG. 22 shows a different embodiment of a MEMS micromirror device 100.

The micromirror device 100 has a structure similar to the MEMS micromirror device 70 of FIG. 19; consequently, parts that are similar are designated by the same reference numbers and will not be described any further. Nonetheless, differently than in the micromirror devices 20 and 70, no metasurfaces (i.e., no metastructures) are present.

The micromirror device 100 comprises an optical waveguide 102 extending between the lid 76 and the body 22, e.g. facing a lateral wall 24A of the package 24. In particular, the optical waveguide 102 extends between the lid 76 and the adhesive layer 27 and, optionally, is monolithic with the lid 76. The optical waveguide 102 is of transparent material (e.g., glass) and is designed to guide the incident light radiation Li emitted by a light source 104 external to the package 24, by allowing its propagation from the light source 104 to the reflecting surface 21A. In details, the optical waveguide 102 defines an optical path for the incident light radiation Li along a main extension direction 106 of the optical waveguide 102 (for example, parallel to the second axis X).

The optical waveguide 102 has an input end 102A and an output end 102B opposite to each other with respect to the main extension direction 106. The input end 102A faces the outside of the MEMS micromirror device 100 (i.e., an environment external to the cavity 23), whereas the output end 102 faces the cavity 23 and thus the reflecting surface 21A (e.g., it extends in the cavity 23). In use, the input end 102A of the optical waveguide 102 is optically coupled to (e.g., faces) the light source 104 that emits the incident light radiation Li; therefore, the incident light radiation Li enters the optical waveguide 102 through the input end 102A and is guided by the optical waveguide 102 so as to exit from it through the output end 102B. As better shown in FIG. 23, the light source 104, the optical waveguide 102 and the tiltable platform 21 are aligned between them along the main extension direction 106.

The output end 102B is shaped to deflect the incident light radiation Li toward the reflecting surface 21A. In particular, the output end 102B is formed by a triangular tip having a deflecting surface 108 inclined with respect to the main extension direction 106. In details, the deflecting surface 108 faces the lid 76 and forms with it an inclination angle θ (e.g., defined between the deflecting surface 108 and the second surface 76B, also called bottom surface 76B, of the lid 76).

Therefore, the optical path of the incident light radiation Li comprises a first segment substantially linear and extending along the main extension direction 106 in the optical waveguide 102 until the deflecting surface 108 is reached, and a second segment substantially linear and inclined with respect to the main extension direction 106, that extends in the cavity 23 from the deflecting surface 108 to the reflecting surface 21A.

In the embodiment of FIG. 22, the inclination angle θ is designed so as to prevent the total internal reflection (TIR) phenomenon at the deflecting surface 108. Therefore, the incident light radiation Li passes through the deflecting surface 108 substantially without being reflected (e.g., with minor and spurious reflections depending on the difference in refractive index between the optical waveguide 102 and the cavity 23 and, for example, lower than about 4% of the incident light radiation Li; optionally, an anti-reflection coating, ARC, can also be used on the deflecting surface 108 to suppress these minor and spurious reflections) and, due to the variation of refractive index experienced between the optical waveguide 102 and the cavity 23 at the deflecting surface 108, is deflected toward the reflecting surface 21A. This is achieved by designing the optical waveguide 102 so that the inclination angle θ is greater than a threshold inclination angle.

As a non-limiting example, when the optical waveguide 102 is made of glass, the inclination angle θ is greater than about 50° and is equal to, for example, 60°. In other words, the incident light radiation Li (considered as a linear light beam with propagation direction substantially parallel to the main extension direction 106) forms, impinging on the deflecting surface 108 and with respect to a normal direction orthogonal to the deflecting surface 108, an impinging angle that is not shown and is complementary to the inclination angle θ for known geometrical properties; thus, when the optical waveguide 102 is made of glass, the impinging angle is lower than about 40° and is, for example, equal to 30°. Nonetheless, these values of the inclination angle θ and of the impinging angle are only provided as examples and are not meant to be limiting for the present invention, since the threshold inclination angle depends on the material used for realizing the optical waveguide 102; other values can analogously be considered when other materials are used for realizing the optical waveguide 102, in a per se known way. For example, the threshold inclination angle increases if a metal layer (e.g., of Aluminum) is present on the deflecting surface 108.

Figure 23:
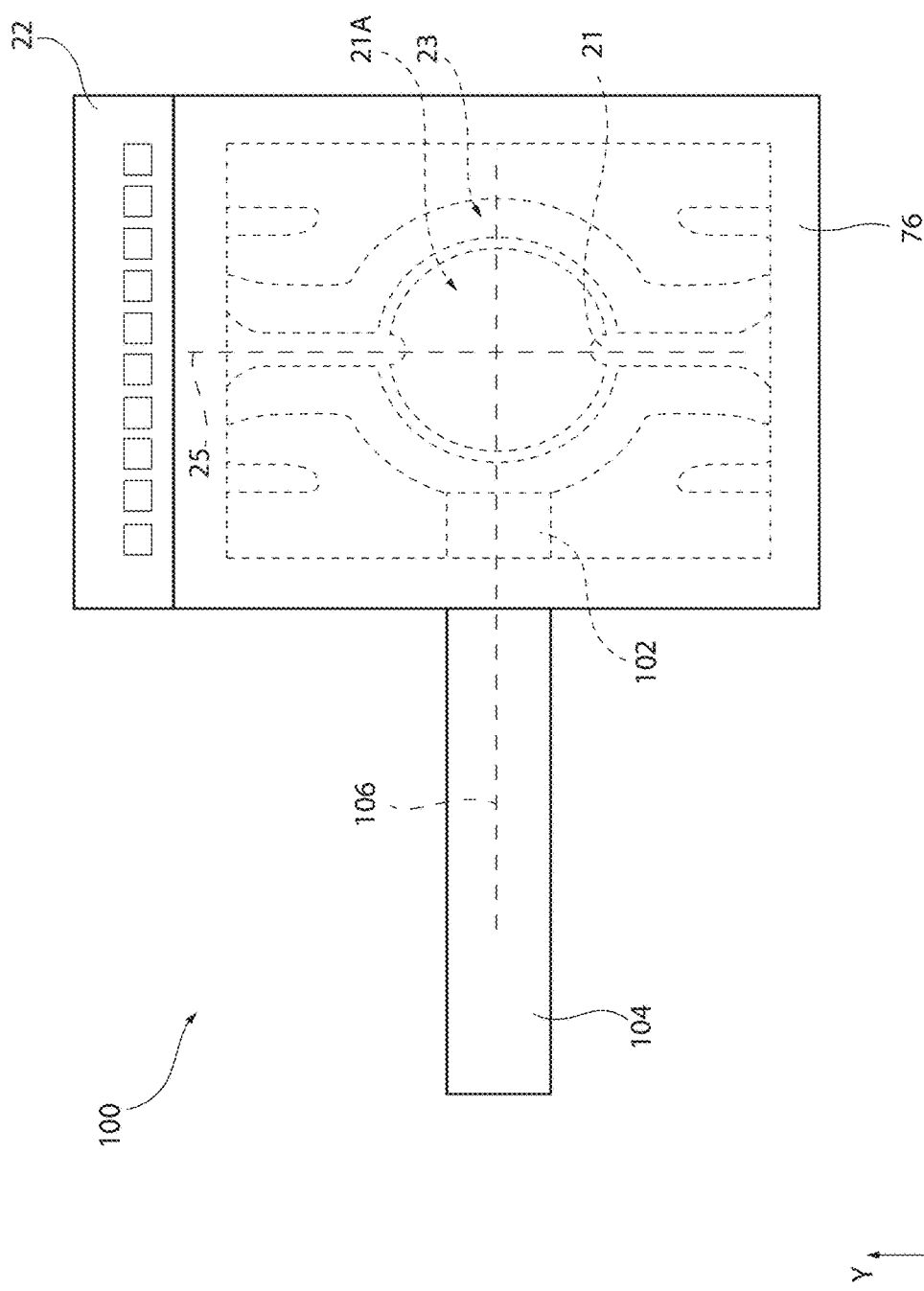
FIGS. 23 and 24 are top views of the micromirror device of FIG. 22, according to respective variants.

FIG. 23 shows a top view of the micromirror device 100, in the horizontal plane XY. As shown, the main extension direction 106 of the optical waveguide 102 can be perpendicular to the oscillation axis 25 (here exemplarily shown parallel to the first axis Y, whereas the main extension direction 106 is exemplarily shown parallel to the second axis X).

Figure 24:
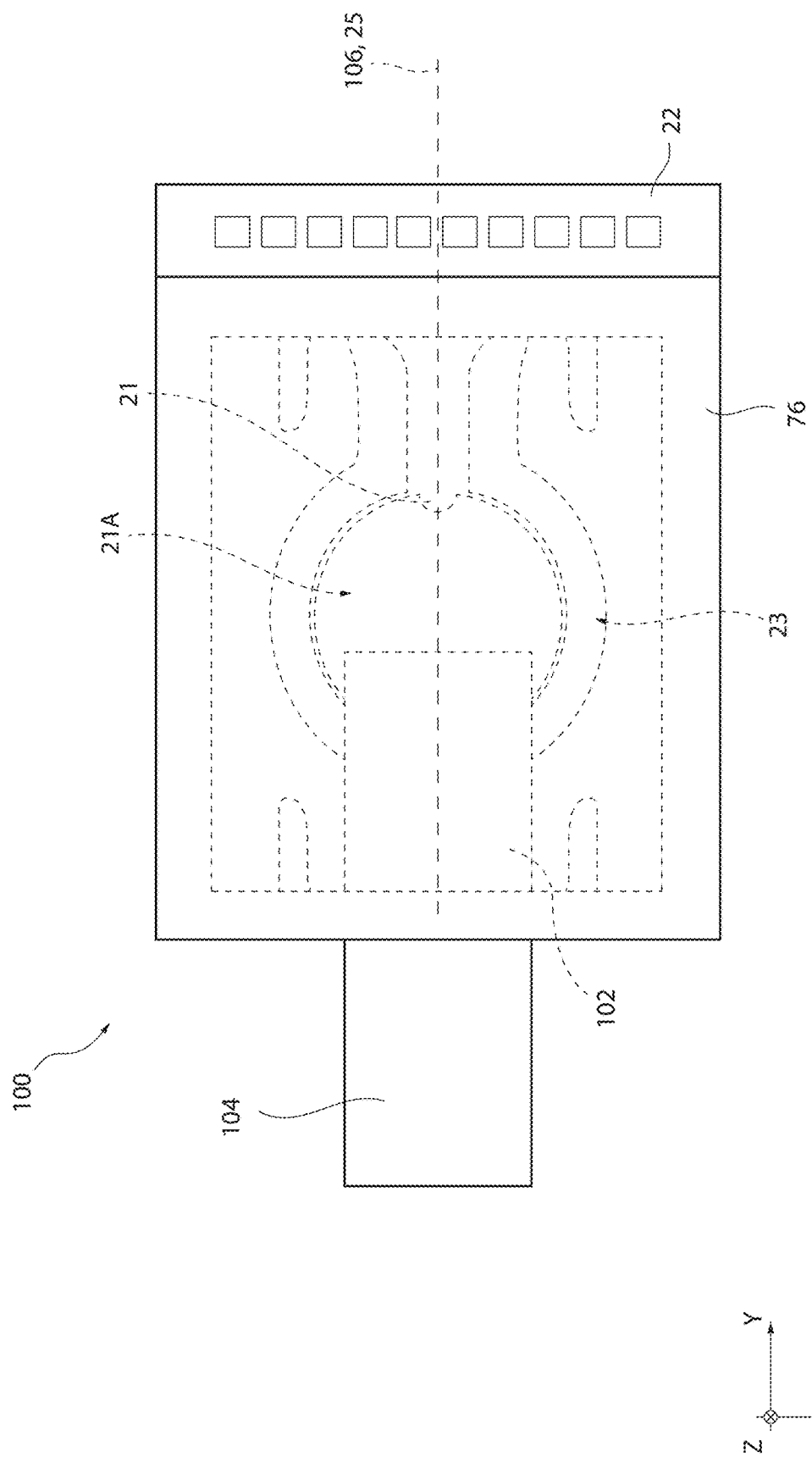

Nonetheless, according to a variant of the micromirror device 100, shown in FIG. 24, the optical waveguide 102 can be arranged with respect to the tiltable platform 21 so as to be parallel to the oscillation axis 25. In other words, the main extension direction 106 of the optical waveguide 102 can be parallel to the oscillation axis 25 and thus extend parallel to the first axis Y.

Figure 25:
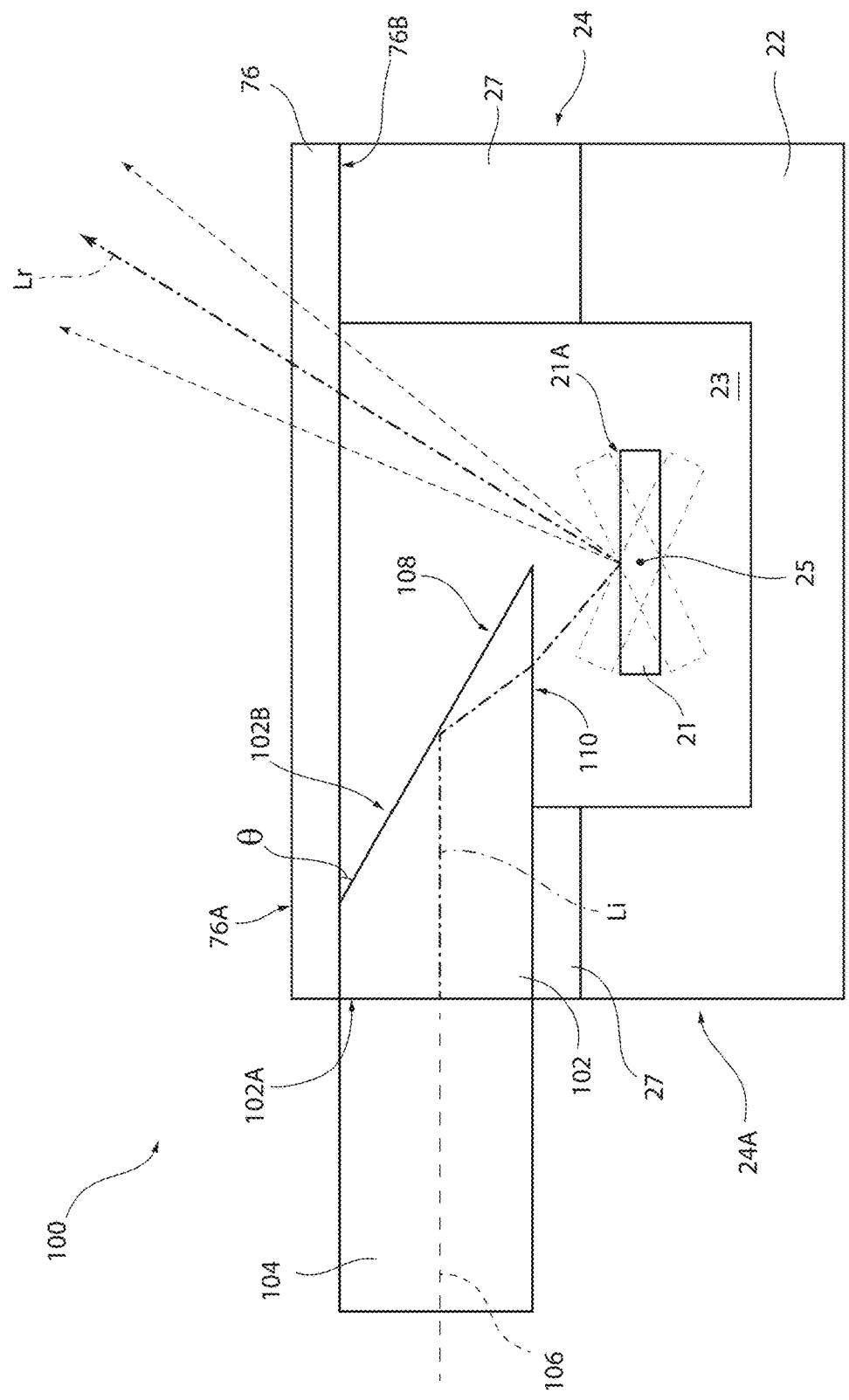
FIG. 25 shows a further variant of the micromirror device shown in FIG. 22.

Moreover, FIG. 25 shows a different embodiment of the micromirror device 100, wherein the inclination angle θ is designed so that the total internal reflection (TIR) phenomenon occurs at the deflecting surface 108. Therefore, the incident light radiation Li travelling in the optical waveguide 102 is completely reflected at the deflecting surface 108 toward the reflecting surface 21A, thus exiting the optical waveguide 102 from a bottom surface 110 of the optical waveguide 102, that faces the reflecting surface 21A (in details, with a deflection due to the difference in refractive index between the optical waveguide 102 and the cavity 23). This is achieved by designing the optical waveguide 102 so that the inclination angle θ is lower than the threshold inclination angle.

As a non-limiting example, when the optical waveguide 102 is made of glass, the inclination angle θ is lower than about 50° and is equal to, for example, 40°. In other words, when the optical waveguide 102 is made of glass, the impinging angle is greater than about 40° and is, for example, equal to 50°.

The MEMS micromirror device 20, 70 described herein has numerous advantages.

It solves the problem of undesired reflected radiation at low costs, since it enables use of wafer-level processing techniques, adopting usual technologies for manufacturing semiconductors from standard flat wafers, as explained above.

Furthermore, the MEMS micromirror device 20, 70 has small overall dimensions, also because the lid 26, 76 is substantially flat and the metastructures 30-32 have smaller thicknesses than the wavelength of the radiation for which the MEMS micromirror device 20, 70 is designed.

Moreover, the use of the optical waveguide 102 to avoid spurious reflections at the lid is a solution simple to be manufactured and robust to be used. In details, the MEMS micromirror device 100 of FIG. 22 presents reduced sizes thus minimizing its encumbrance, whereas the MEMS micromirror device 100 of FIG. 25 maximizes the optical efficiency due to the use of the TIR.

Finally, it is clear that modifications and variations may be made to the MEMS micromirror device described and shown herein, without thereby departing from the scope of the present invention, as defined in the attached claims. For instance, the different embodiments described may be combined so as to provide further solutions.

Moreover, the MEMS micromirror device can be of biaxial type. In particular, when the MEMS micromirror device 20 is of a biaxial type, and is thus configured to rotate about two axes, the metastructures 30-32 may have linearly variable densities along one of the two directions parallel to the rotation axes or along a direction intermediate between them.

The diffractive optical elements 35 may have different shapes, in addition to the ones described above.

If so desired, it is possible to provide both the first metastructure 30 and the second metastructure 31 on the lid 26, and the third metastructure 32 on the tiltable platform 21. Moreover, at least the third metastructure 32 on the tiltable platform 21 can be combined with the optical waveguide 102 to further increase the optical properties of the MEMS micromirror device.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A MEMS micromirror device, comprising:
   a package including a containment body and a lid transparent to light radiation, the package forming a cavity, the lid being planar in shape;
   a tiltable platform housed in the cavity and having a reflecting surface; and
   an optical waveguide having an input end that faces outside the cavity and is configured to be optically connected to a light source, and an output end that extends within the cavity, the optical waveguide being configured to receive through the input end the light radiation emitted by the light source and to guide the light radiation toward the reflecting surface;
   wherein the containment body comprises a monolithic cup-shaped body having a base and a sidewall extending outwardly therefrom to define the cavity, with an adhesive layer directly mechanically coupling a first portion of the lid to the sidewall and the optical waveguide being sandwiched between a second portion of the lid and the adhesive layer so that the lid overlies the cavity.

2. The MEMS micromirror device according to claim 1, wherein the optical waveguide extends between the lid and the containment body, wherein the input end and the output end are opposed between each other along a main extension direction of the optical waveguide, and wherein the output end of the optical waveguide comprises a deflecting surface that is transversal to the main extension direction, faces a bottom surface of the lid and forms an inclination angle θ with said bottom surface.

3. The MEMS micromirror device according to claim 2, wherein the inclination angle θ is greater than a threshold inclination angle so that the light radiation, by passing through the deflecting surface, is deflected on the reflecting surface.

4. The MEMS micromirror device according to claim 2, wherein the inclination angle θ is lower than a threshold inclination angle so that the light radiation, by being reflected at the deflecting surface for total internal reflection, is deflected on the reflecting surface.

5. The MEMS micromirror device according to claim 1, wherein the optical waveguide is monolithic with the lid.

\* \* \* \* \*